(12) United States Patent
Matsumoto et al.

(10) Patent No.: US 7,040,845 B2
(45) Date of Patent: May 9, 2006

(54) SCREW COMPRESSOR AND METHOD OF MANUFACTURING ROTORS THEREOF

(75) Inventors: Kazuhiro Matsumoto, Tsuchiura (JP); Tomu Kato, Tsuchiura (JP); Hirotaka Kameya, Tsuchiura (JP)

(73) Assignee: Hitachi Industries Co., Ltd., Tokyo (JP)

( * ) Notice: Subject to any disclaimer, the term of this patent is extended or adjusted under 35 U.S.C. 154(b) by 0 days.

(21) Appl. No.: 11/067,701

(22) Filed: Mar. 1, 2005

(65) Prior Publication Data

US 2005/0147519 A1 Jul. 7, 2005

Related U.S. Application Data

(63) Continuation of application No. 10/616,972, filed on Jul. 11, 2003.

(30) Foreign Application Priority Data

Jan. 15, 2003 (JP) .............................. 2003-006501

(51) Int. Cl.
    *B23C 3/00* (2006.01)
(52) U.S. Cl. ..................... 409/132; 409/131; 29/889; 29/889.6; 29/889.7; 416/236 R; 418/201.1
(58) Field of Classification Search ........ 409/131–132; 29/889, 889.6, 889.7; 416/236 R; 418/201.1
    See application file for complete search history.

(56) References Cited

U.S. PATENT DOCUMENTS

| 3,073,513 A | | 1/1963 | Bailey |
| 3,179,330 A | | 4/1965 | Maccollian |
| 3,282,495 A | | 11/1966 | Walls |
| 3,807,911 A | * | 4/1974 | Caffrey .......................... 418/9 |
| 4,028,992 A | * | 6/1977 | Kuehnle ...................... 409/132 |
| 4,412,796 A | * | 11/1983 | Bowman .................. 418/201.3 |
| 4,671,749 A | * | 6/1987 | Naraki et al. ................ 418/149 |
| 4,714,418 A | * | 12/1987 | Matsubara et al. ....... 418/201.1 |
| 4,850,761 A | * | 7/1989 | Breuer et al. ............... 409/132 |
| 4,938,672 A | * | 7/1990 | Ingalls ..................... 418/201.1 |
| 5,060,531 A | | 10/1991 | Iguchi et al. |
| 5,378,091 A | * | 1/1995 | Nakamura ................... 409/132 |
| 6,077,002 A | * | 6/2000 | Lowe .......................... 409/132 |
| 6,386,848 B1 | * | 5/2002 | Nachi ....................... 418/201.3 |
| 6,612,820 B1 | | 9/2003 | Staat et al. |
| 6,869,259 B1 | * | 3/2005 | Lebkuechner ............... 409/132 |
| 2005/0244294 A1 | * | 11/2005 | Murakami et al. ........ 418/201.1 |

FOREIGN PATENT DOCUMENTS

| JP | 01208587 | 8/1989 |
| JP | 02067488 | 3/1990 |
| JP | 04-358787 | 12/1992 |
| JP | 8-19733 | 8/1996 |

* cited by examiner

(Continued)

*Primary Examiner*—Boyer D. Ashley
*Assistant Examiner*—Eric A. Gates
(74) *Attorney, Agent, or Firm*—Antonelli, Terry, Stout and Kraus, LLP.

(57) ABSTRACT

A screw compressor comprises a casing, and a male and a female rotor formed with axially twisted screw grooves and accommodated in the casing, the both rotors being rotated by timing gears fixed to the respective rotors while a desired minute gap is kept therebetween, and a method of manufacturing rotors therefor. In the screw compressor, the male and female rotors formed with axially twisted screw grooves in the casing comprise concave stripes having a minute depth and provided on the respective screw grooves to extend along directions of twist thereof, and leakage of a compressed air is less to give a high compression efficiency.

4 Claims, 13 Drawing Sheets

|Δta − Δtb| ≦ MACHINING TOLERANCE

FIG.15 a $$h = r - \sqrt{r^2 - \left(\frac{P}{2}\right)^2}$$

SCREW COMPRESSOR AND METHOD OF MANUFACTURING ROTORS THEREOF

This is a continuation application of application Ser. No. 10/61 6,972 filed Jul. 11, 2003, which claims the priority based on Japanese Patent Application No. 2003-006501 filed Jan. 15, 2003.

BACKGROUND OF THE INVENTION

The present invention relates to a screw compressor comprising a casing, a male and a female rotor formed with axially twisted screw grooves arranged in the casing, the both rotors being rotated by timing gears fixed to the respective rotors while a desired minute gap is kept therebetween, and a method of manufacturing rotors therefor, and more particularly, to a screw compressor, in which leakage of a compressed air during rotation of the both rotors is less and a high compression efficiency is obtained, and a method of manufacturing rotors therefor.

With screw compressors, bores are formed in a casing to receive therein a male rotor and a female rotor. The bores include a male rotor side bore and a female rotor side bore, which are circular in cross section and parallel to each other. Respective axial centers of the male rotor side bore and the female rotor side bore are coincident with axes of the male rotor and the female rotor. The male rotor and the female rotor are rotated through timing gears with a minute gap between respective teeth of the male rotor and the female rotor, which gap eliminates short of contact between respective teeth, and rotation of the rotors causes suction and discharge of an air to be made use of for compressors and vacuum pumps.

An important problem in screw compressors resides in that a desired compression efficiency cannot be obtained since a compressed air leaks through a gap between a male rotor and a female rotor and a gap between the male and female rotors and bores receiving the rotors when the male and female rotors are rotated.

In order to solve the problem, hitherto, tooth profiles of respective rotors are formed with high accuracy, and there have been proposed as a working method therefor milling with formed tooth profile blades, hobbing with hob cutter, turning process with high-rigidity NC lathes, or the like (see JP-A-8-197331).

In the case where machining with high accuracy is demanded to obtain a high compression efficiency, the above conventional technique is not sufficient and a tooth profile is formed by means of grinding with a grinding machine provided with grindstone.

Since rotors are made of a material of high rigidity, grindstone abrades soon, or trial grinding with a new grindstone is necessary for maintenance of accuracy in the case where grindstone is replaced by a new one to perform grinding on rotors of a screw compressor having a different capacity, and while measuring a tooth profile, finish grinding is performed. Accordingly, there is caused a problem that hands and time are needed in the case of multi-product production.

Also, since grindstone used in grinding of rotors for screw compressors of a large capacity is large-sized and significantly heavy, a crane must be used at the time of grindstone replacement, which requires a manual work to present an obstacle to automatic working.

BRIEF SUMMARY OF THE INVENTION

Therefore, it is an object of the invention to provide a screw compressor, in which leakage of a compressed air is less and high compression efficiency is obtained.

Also, it is an object of the invention to provide a method capable of easily manufacturing rotors for a screw compressor with high compression efficiency.

To attain the above object, the invention provides a screw compressor comprising a casing, a male and a female rotor formed with axially twisted screw grooves arranged in the casing, the both rotors being rotated by timing gears fixed to the respective rotors while a desired minute gap is kept therebetween, and the respective rotors comprising concave stripes having a minute depth and provided on the respective screw grooves to extend along directions of twist thereof.

To attain the above object, the invention provides a method of manufacturing a screw compressor, the method comprising performing a finish working, in which concave stripes having a minute depth and extending along directions of twist of screw grooves on a male rotor or a female rotor are formed by machining performed by a machining-center provided with a ball end mill as a tool.

Since the respective screw grooves on the respective rotors are provided to be directed from a suction port toward a discharge port, concave stripes having a minute depth and formed on the respective screw grooves of the respective rotors to extend along directions of twist thereof serve as passages for a compressed air directed toward the discharge port rather than gaps for leakage of a compressed air, so that although irregularities are provided on surfaces of the screw grooves to make a gap present, leakage is conversely reduced as compared with the case where the surfaces are accurately ground to make a gap small.

Since such concave stripes are formed by means of a ball end mill as a tool of a machining-center, replacement of such tool is easy and control with the machining-center is easy not to impose much burden on a worker.

Other objects, features and advantages of the invention will become apparent from the following description of the embodiments of the invention taken in conjunction with the accompanying drawings.

DETAILED DESCRIPTION OF THE INVENTION

The invention will be described hereinafter on the basis of an embodiment shown in FIGS. 1 to 3.

Figure 1:
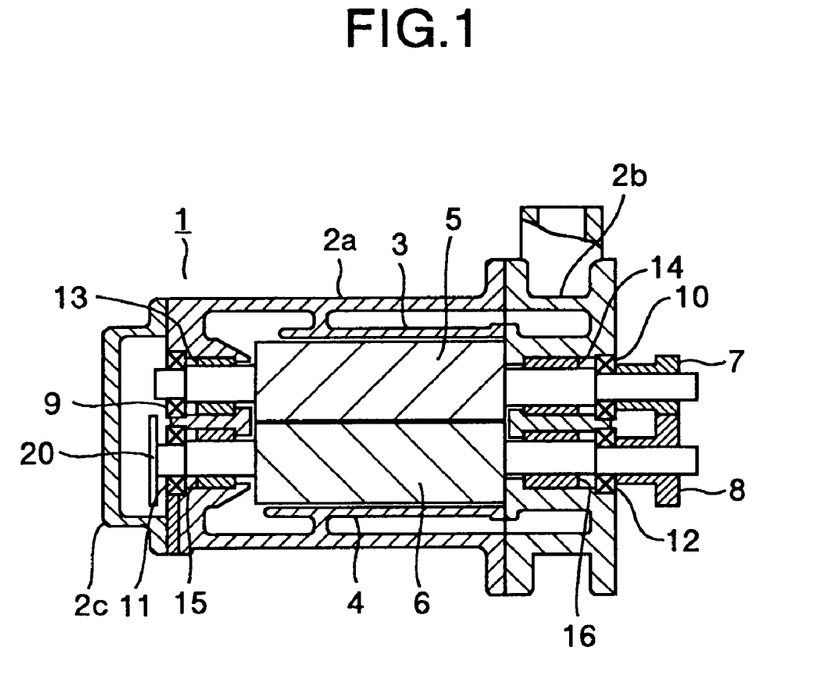
FIG. 1 is a longitudinal cross sectional view showing a screw compressor according to an embodiment of the invention when viewed from above.
Figure 2:
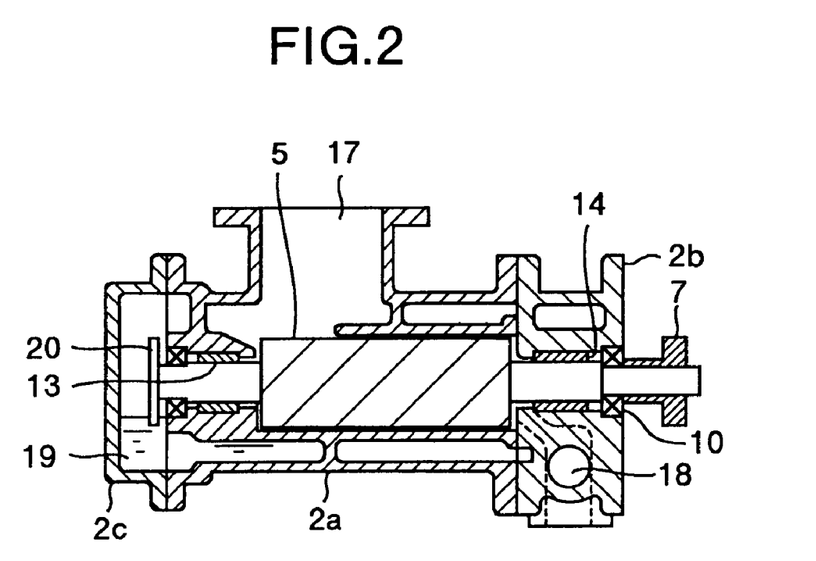
FIG. 2 is a longitudinal cross sectional view showing the screw compressor of FIG. 1 when viewed horizontally.
Figure 3:
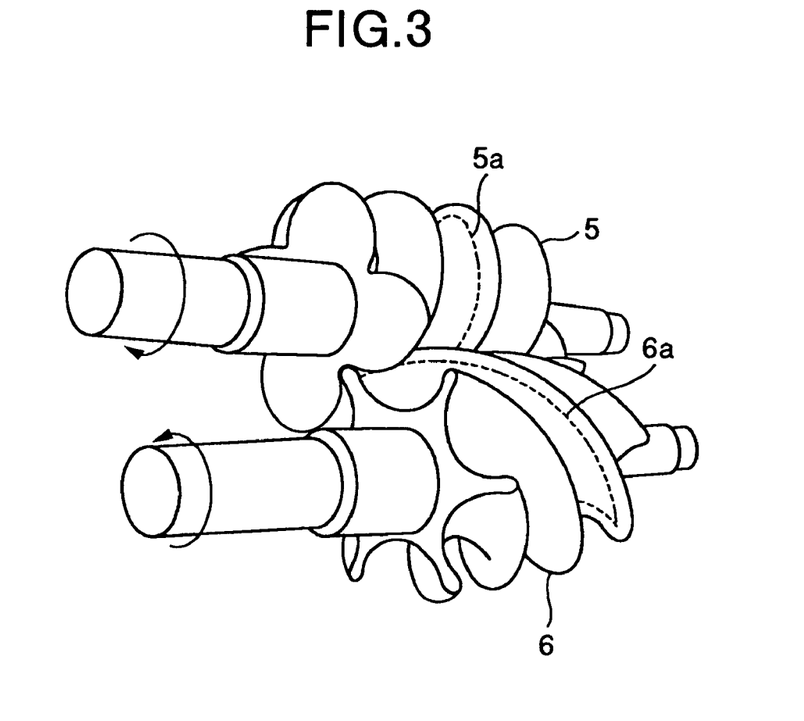
FIG. 3 is a perspective view showing a state, in which a male rotor and a female rotor are arranged in the screw compressor of FIG. 1.

FIG. 1 is a longitudinal cross sectional view showing a screw compressor 1 according to the invention when viewed from above, FIG. 2 is a longitudinal cross sectional view showing the screw compressor 1 when viewed horizontally, and FIG. 3 is a perspective view showing a state, in which a male rotor 5 and a female rotor 6 are arranged in the screw compressor 1.

Referring to FIGS. 1 to 3, a casing 2 comprises a main casing 2a, a discharge-side casing 2b, and an end cover 2c, and the main casing 2a has therein bores 3, 4. The bores 3, 4 are circular in cross section and parallel to each other, the bore 3 accommodates therein the male rotor 5, and the bore 4 accommodates therein the female rotor 6. The male rotor 5 has four teeth, and the female rotor 6 has six teeth. Respective axial centers of the bore 3 on a side of the male rotor and the bore 4 on a side of the female rotor are coincident with respective axes of the male rotor 5 and the female rotor 6. And the male rotor 5 and the female rotor 6 are rotated via timing gears 7, 8 in opposite directions as shown in FIG. 3 with a minute gap therebetween eliminating contact between respective teeth thereof.

The male rotor 5 and the timing gear 7, and the female rotor 6 and the timing gear 8 are firmly fixed by shrink-fitting. The timing gear 7 meshes with a pull gear (not shown), by which the male rotor 5 is rotated via the timing gear 7, and the female rotor 6 is rotated via the timing gear 8, which meshes with the timing gear 7.

The reference numerals 9, 10 and 11, 12 denote bearings for rotatably supporting the respective rotors 5, 6 on the main casing 2a and the discharge-side casing 2b, respectively, and the reference numerals 13, 14 and 15, 16 denote shaft seal devices, respectively, provided between the main casing 2a and the respective rotors 5, 6 and between the discharge-side casing 2b and the respective rotors 5, 6. The main casing 2a is a dual structure, of which an internal space is supplied with a cooling medium from a side of the discharge-side casing 2b.

The reference numeral 17 denotes an air suction port, and 18 an air discharge port for the compressed air. A space defined by the main casing 2a and the end cover 2c serves as an oil reservoir filled with a lubricating oil 19, and a slinger 20 fixed to an end of the female rotor 6 splashes the lubricating oil with rotation of the female rotor 6 to feed the lubricating oil to the bearings 9, 11.

A multiplicity of concave stripes 5a, 6a, which have a minute depth and extend along directions of twist of screw grooves of the male rotor 5 and the female rotor 6 are provided on whole surfaces of the rotors 5, 6. In FIG. 3 showing a state, in which the both rotors 5, 6 are viewed from a side of the end cover 2c, respective ones among the multiplicity of concave stripes 5a, 6a are indicated by dotted lines for the purpose of simplicity.

Subsequently, an explanation will be given to a method of manufacturing the multiplicity of concave stripes 5a, 6a on the whole surfaces of the respective screw grooves of the male rotor 5 and the female rotor 6, and a manufacturing apparatus therefor.

Figure 4:
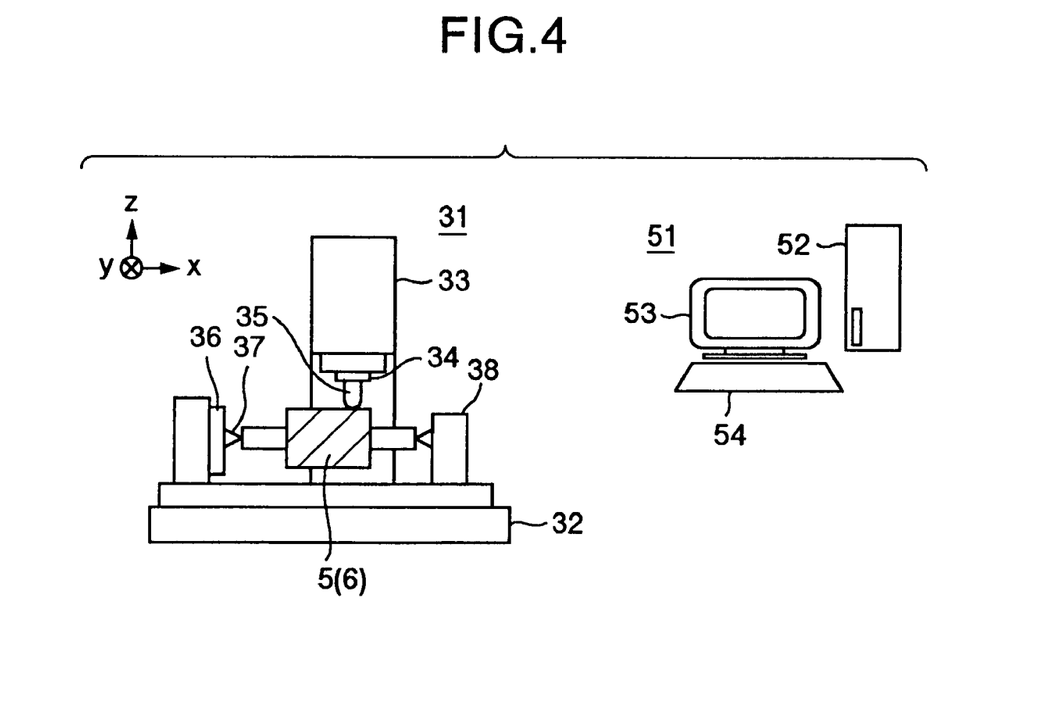
FIG. 4 is a schematic view showing a machining-center as a manufacturing apparatus for forming concave stripes on respective screw grooves of respective male and female rotors, and a personal computer serving as a control unit therefor.

FIG. 4 is a schematic view showing a machining-center 31 as a manufacturing apparatus for forming the multiplicity of concave stripes 5a, 6a on the whole surfaces of the respective screw grooves of the male rotor 5 and the female rotor 6, and a personal computer 51 serving as a control unit (control board) therefor.

The machining-center 31 comprises a machining-center body 33 movable on a base 32 in respective horizontal directions X, Y, and the machining-center body 33 holds a ball end mill 35 downward in a Z-axis direction with the use of a hydraulic holder 34 to move the ball end mill 35 in the respective X-axis and Y-axis directions and in the Z-axis direction (vertical). A rotary table 36 is provided on the base 32 and the rotary table 36 has a rotating shaft (axis A of rotation), which is horizontal to be oriented in the X-axis direction, and a cemented carbide center 37 is attached at a center of rotation. A tailstock 38 is provided to be opposed to the cemented carbide center 37 on the rotary table 36, whereby the male rotor 5 (or the female rotor 6) is supported between the cemented carbide center 37 and the tailstock 38 to center at both ends thereof, and the male rotor 5 (or the female rotor 6) thus supported is rotated about the axis A. The personal computer 51 comprises a personal computer body 52, monitoring screen 53, and a keyboard 54 to drive and control the machining-center 31 with the use of a software program described later. Depiction of a cable for connection between the machining-center 31 and the personal computer 51 is omitted.

Subsequently, an explanation will be given to a manufacturing process of the respective male and female rotors 5, 6 with reference to FIG. 5.

First, a conventional, known work machine is used to perform rough working of the male rotor 5 or the female rotor 6 in STEP (abbreviated below to "S") 100. In addition, an explanation will proceed assuming that the male rotor 5 is manufactured.

In S 200, shape of the male rotor 5 after the rough working is measured.

Figure 6:
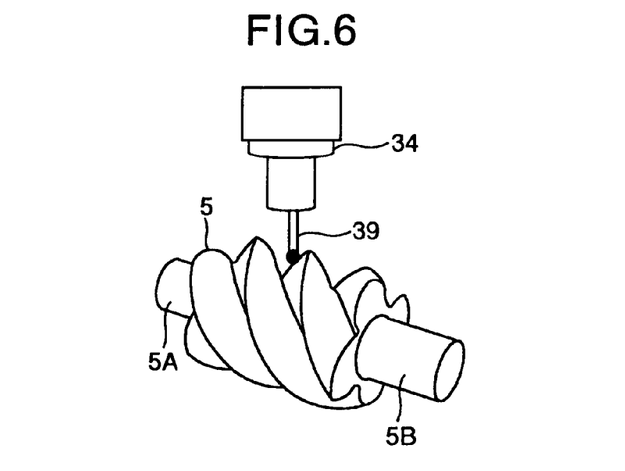
FIG. 6 is a view illustrating a state of shape measurement of a male rotor in a measurement processing of FIG. 5.

This measurement is taken in a state, in which a touch probe 39 shown in FIG. 6 is mounted, in place of the ball end mill 35, on the holder 34 of the machining-center 31 shown in FIG. 4.

Figure 7:
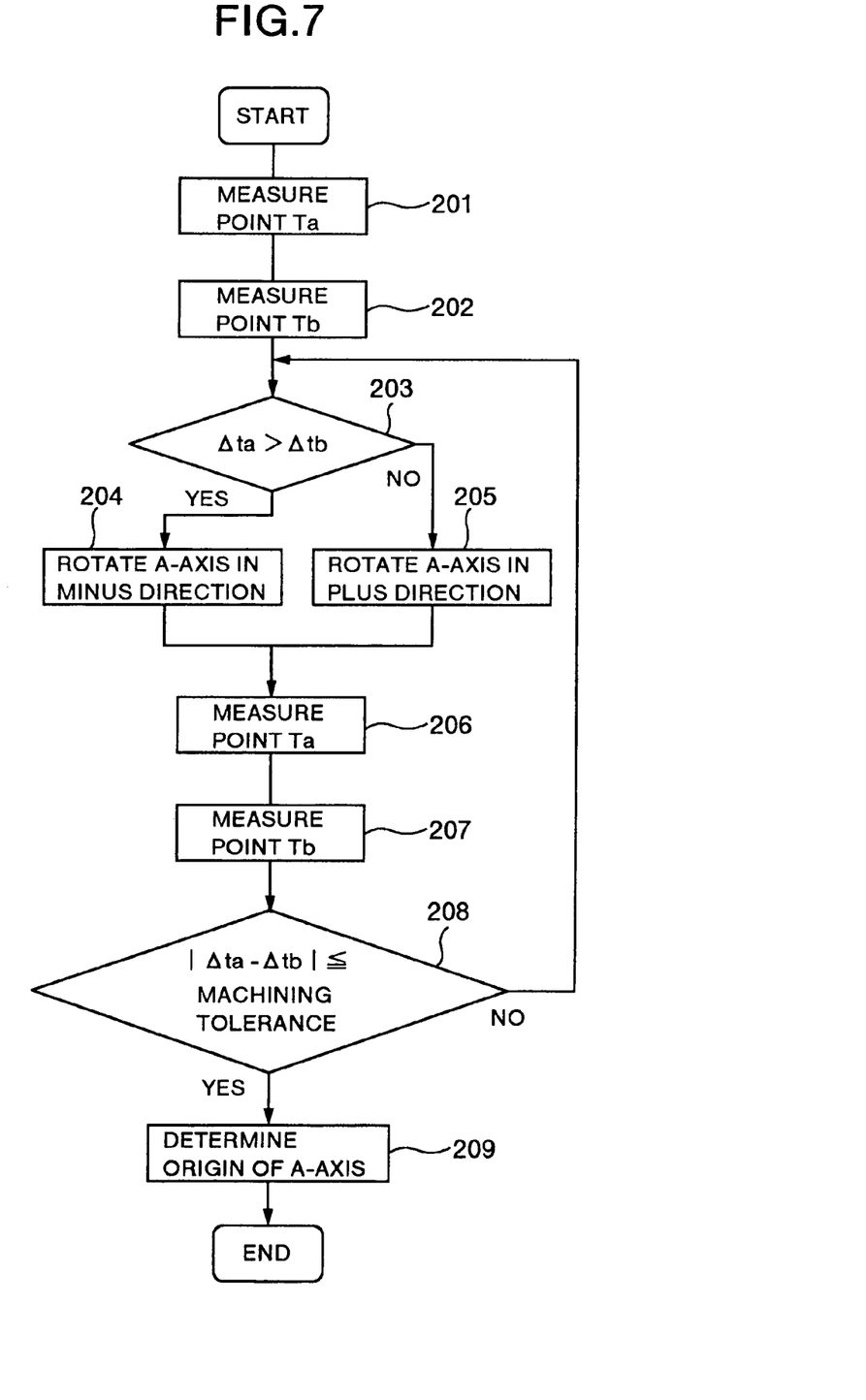
FIG. 7 is a flow chart illustrating a state of shape measurement of a male rotor in the measurement processing of FIG. 5.
Figure 8:
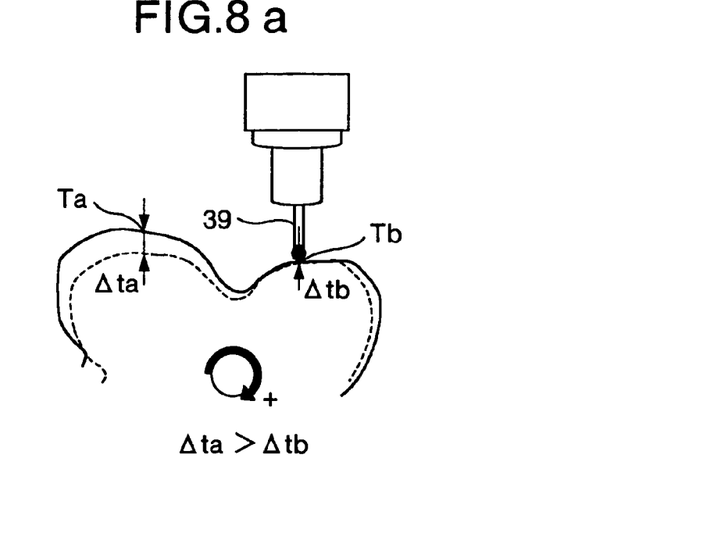
FIGS. 8a, 8b and 8c are views illustrating a state of shape measurement of a male rotor in the measurement processing of FIG. 5.

Shape measurement of the male rotor 5 will be described in details with reference to FIGS. 7 and 8.

First, it is confirmed whether the male rotor 5 has been set with a center of axis thereof correctly coincident with X-axis of the machining-center 31. That is, the touch probe 39 is caused to abut against, for example, an end face position of a cylindrical portion 5B, onto which the timing gear is to be fitted, in the X-axis direction, whereby an encoder built in the machining-center 31 obtains a position coordinate data of the touch probe 39.

Subsequently, the touch probe 39 is caused to abut against the cylindrical portions 5A, 5B, onto which the bearings 9, 10 are to be fitted, in three locations on outer peripheries of the cylindrical portions, whereby the encoder built in the machining-center 31 obtains position coordinate datum of the touch probe 39. Assuming that three datum at this time correspond to corner positions of a triangle inscribing a circle, a center position of the circle is calculated to provide an axial center of the male rotor 5. Alternatively, using the touch probe 39 to obtain a position coordinate data of a diameter in outermost peripheral locations in the Y-axis direction, a central position in the Y-axis direction is calculated and a position dropping a radius distance in the Z-axis direction from an outermost peripheral location in the Z-axis direction is assumed to be an axial center of the male rotor 5. And the axial center is made to be coincident with a X-axis center of the machining-center 31.

Subsequently, in order to correctly set the male rotor 5 in the A-axis direction, the touch probe 39 is used in S 201 indicated in FIG. 7 to measure a position data Ta of a tooth in the Z-axis direction, in an optional tooth position in the X-axis direction as shown in FIG. 8a. In addition, solid lines in FIG. 8a to 8c represent actual profiles of the male rotor 5, and dotted lines represent design profiles. Since a design position data corresponding to the position data Ta is beforehand known in the personal computer body 52, a deviation Δta between the both position datum is readily obtained. And a position data Tb is measured in S 202 by causing the rotary table 36 to rotate the male rotor 5 about the A-axis to have a facing tooth abutting against the touch probe 39. Since a design position data at this time is known in the personal computer body 52, a deviation Δtb is calculated.

Subsequently, the magnitude correlation between the deviation Δta and the deviation Δtb is found, and the processing proceeds to S 204 when the deviation Δta is greater than the latter, and proceeds to S 205 when the deviation Δta is less than the latter. FIG. 8b shows the case where the deviation Δta is less than the deviation Δtb.

In S 204 or S 205, the A-axis is rotated a predetermined minute angle in a minus direction or in a plus direction, and the position datum in the points Ta, Tb are measured in S 206 and S 207, whereby new positional deviations Δta and Δtb after rotation through the minute angle are obtained. Thereafter, it is determined in S 208 whether a difference between these deviations is within a machining tolerance, and when the difference is within the machining tolerance, a position of the A-axis at this time is decided as an origin (S 209) to terminate the processing. When the difference is outside the machining tolerance, the processing is returned to S 203, in which the processing having been described is repeated until the difference comes within the machining tolerance, and terminated. Thus setting of the male rotor 5 is terminated.

Subsequently, an explanation will be given to a measurement profile K shown in FIG. 9.

Figure 10:
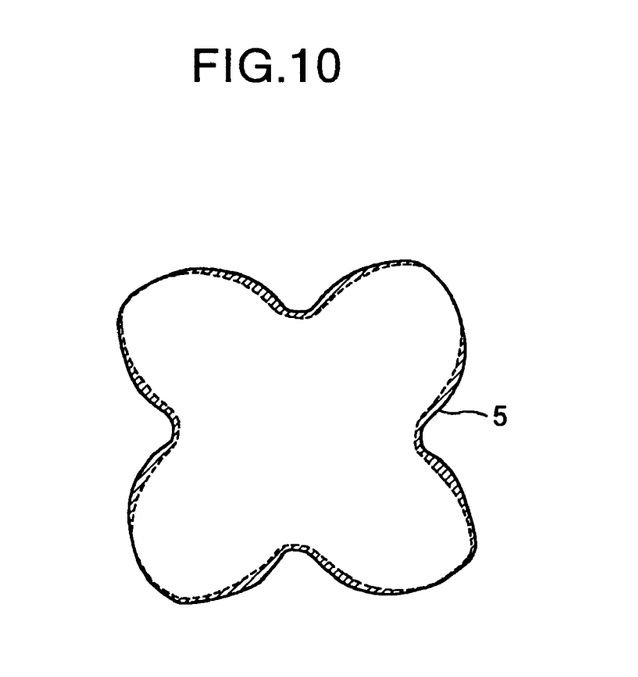
FIG. 10 is a view showing cross sectional shapes of a male rotor after rough working and after finish working.

A cross sectional shape in the X-axis direction shown in FIG. 10 is caught by having the touch probe 39 abutting against the male rotor 5 in an optional position thereon, rotating the male rotor 5 minute angle by minute angle about the A-axis to have the touch probe 39 abutting against the male rotor, finding a position data of the male rotor surface in the Z-axis direction, which position data is calculated from an encoder built in the touch probe 39, as shown in FIG. 6, and repeating the processing. And a cross sectional shape in the X-axis direction, like that shown in FIG. 10, is caught by shifting the male rotor 5 a minute distance in the X-axis direction and having the touch probe 39 abutting against the male rotor. An external shape of the male rotor 5 shown in FIG. 6 can be drawn by executing such processing over a whole length of the male rotor 5 in the X-axis direction and integrating respective position datum as measured in the X-axis, Y-axis, and Z-axis directions. Actually, a whole external shape is created by taking measurements over an optional distance, for example, 10 mm by 10 mm from both ends of the male rotor 5 in the X-axis direction and using an image processing for non-measured regions to extend a shape of a region, in which measurement is taken, in a direction of twist of a concerned screw groove. This is the measurement in S 200.

Figure 9:
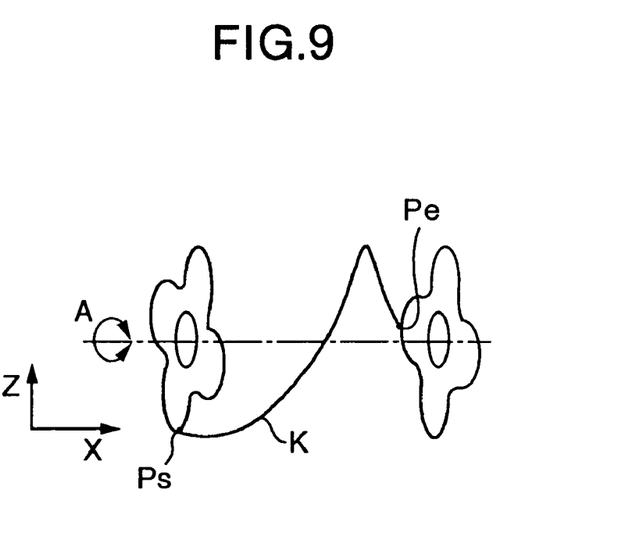
FIG. 9 is a view showing a measurement profile in an optional position, obtained in the measurement of FIG. 6.

And a measurement profile K shown in FIG. 9 can be obtained when three-dimensionally shown based on an origin relative to a position of movement in the X-axis direction from a starting point Ps on the suction side to a terminating point Pe on the discharge side and to an angle of rotation about the A-axis.

Meanwhile, when a three-dimensional measuring equipment is used, not only the measurement profile K of an optional position three-dimensionally represented based on the origin relative to a position of movement in the X-axis direction from a starting point Ps on the suction side to a terminating point Pe on the discharge side shown in FIG. 9 and to an angle of rotation about the A-axis but also a profile of a whole surface of the male rotor 5 can be readily obtained by tracing and measuring an external shape of the male rotor 5 with the use of a sensor.

A design position data in the Z-axis direction, over a whole length in the X-axis direction when moved a minute distance in the X-axis direction and rotated a minute angle about the A-axis makes a design profile, which is made a design value for working of concave stripes, which have a minute depth and extend along directions of the screw grooves, performed by the ball end mill 35.

When measurements in S 200 are terminated, it is determined in S 300 whether there is a need of finish working. In the rough working in S 100 shown in FIG. 5, any working beyond finish working in S 500 is not applied and a data possessed by the profile of the male rotor 5 indicated by solid lines in FIG. 10 is greater than a data possessed by a design profile, indicated by dotted lines, after the finish working. Accordingly, it is determined from a deviation between the datum possessed by the profiles that the finish working is needed, and a correction processing is applied in S 400 on the deviation for the finish working and then the finish working is carried out in S 500.

In the finish working, the ball end mill 35 performs working of concave stripes of a minute depth along the directions of twist of the screw grooves. A multiplicity of such concave stripes (5a or 6a in FIG. 3) are provided on the whole surface of each of the screw grooves along the directions of twist of the respective screw grooves.

The ball end mill 35 performing the finish working in the machining-center 31 shown in FIG. 4 is positionally fixed in the Z-axis direction and rotates about the Z-axis, and the machining-center body 33 is moved minute distance by minute distance in the X-axis direction while the rotary table 36 rotates the male rotor 5 minute angle by minute angle about the A-axis, whereby individual concave stripes having a measurement profile K from a starting point Ps on the suction side to a terminating point Pe on the discharge side can be formed. Formation of the concave stripes is executed while these concave stripes are subjected to a correction processing for all the screw grooves of the male rotor 5 so that the measurement profiles K obtained in measurement of the male rotor 5 are coincident with design profiles K.

Here, an explanation will be given to the correction processing.

Figure 11:
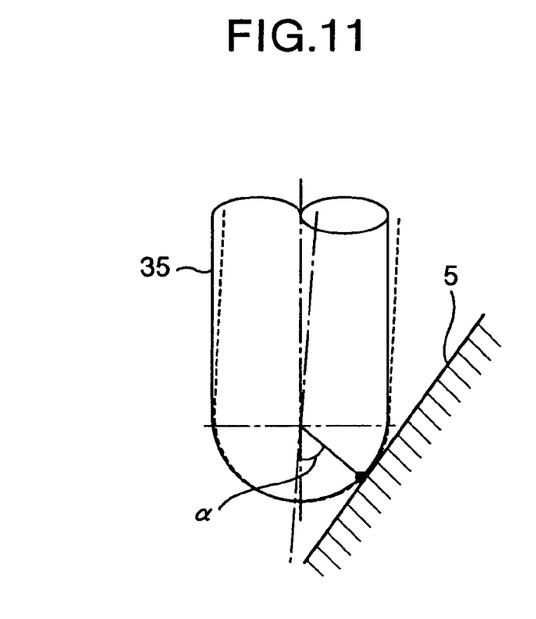
FIG. 11 is a view illustrating a state of machining of an inclined surface with a ball end mill.

While the finish working is set expecting that the ball end mill 35 extends straight in the Z-axis direction as shown by solid lines in FIG. 11 to perform working at its lowermost end, worked surfaces of the male rotor 5 and the female rotor 6 are those of the screw grooves, against inclined surfaces of which the ball end mill abuts to perform machining. In this case, the ball end mill 35 is acted by a reaction force from the inclined surface to be flexed as shown by dotted lines in the drawing. As shown in FIG. 10, since the screw grooves of the male rotor 5 and the female rotor 6 are involute in shape and a angle α of contact is not uniform, deflection of the ball end mill 35 is varied such that the smaller the angle α of contact, the smaller the deflection and the larger the angle α of contact, the larger the deflection, thus a variation in deflection leading to a variation in machining accuracy. Concretely, a large deflection results in insufficiency in machining.

Figure 5:
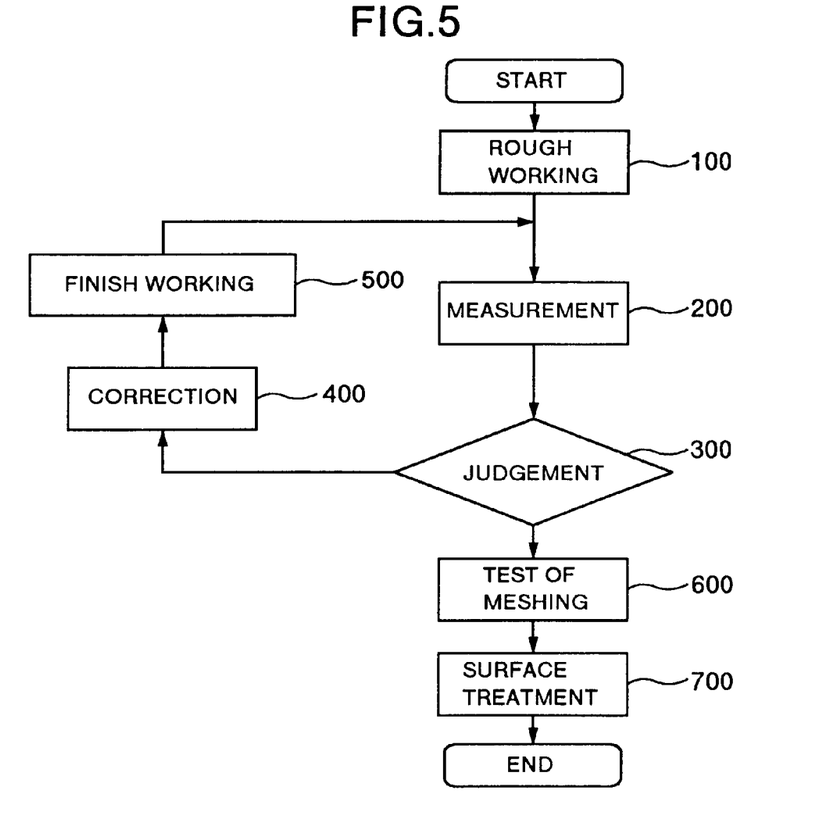
FIG. 5 is a flow-chart showing a manufacturing process of the respective male and female rotors.

Hereupon, the correction processing S 400 shown in FIG. 5 comprises such correction to bring about a desired finish working.

Subsequently, an explanation will be given to the correction processing S 400.

Figure 12:
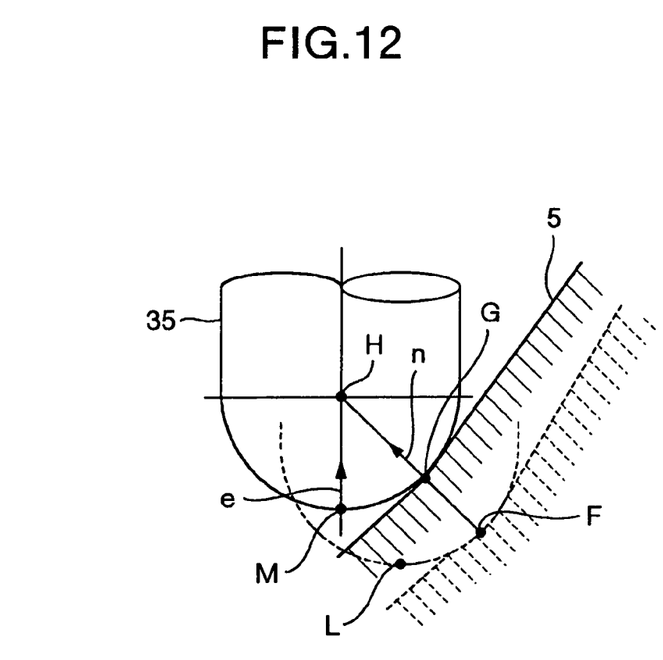
FIG. 12 is a view illustrating formation of NC data for correct machining of the inclined surface with a ball end mill.

It is assumed in FIG. 12 that the ball end mill 35 cuts the male rotor 5 in an optional machining position G on an inclined surface shown by a solid line. A center H of a ball of the ball end mill 35 is located on an extension of a normal vector n at the machining position G. A NC data command point M of the machining-center 31 corresponds to a tip end (lowermost end) of the ball end mill 35 to be located on an extension of an axis vector e of the ball end mill 35. Here, where Po indicates a position data of the machining position G and r indicates a tool radius of the ball end mill 35, a position data Tnco of the NC data command point M can be represented by the following formula.

$$Tnco = Po + r \cdot n - r \cdot e \quad (1)$$

In the case where the ball end mill 35 performs machining up to a position F located on an opposite extension of the normal vector n at the machining position G, a position data Pa of the position F can be represented by the following formula where Δd indicates a distance between the both positions F, G.

$$Pa = Po - \Delta d \cdot n \quad (2)$$

From the above, a position data Tnca of a NC data command point L of the ball end mill 35 performing machining at the position F can be represented by the following formula.

$$Tnca = Pa + r \cdot n - r \cdot e \quad (3)$$
$$= Po - \Delta d \cdot n + r \cdot n - r \cdot e$$

By using the formula (3) to find a position data Tnca of a NC data command point L of the ball end mill 35 for all design values of a tooth profile shape, machining proceeds to an inclined surface shown by a dotted line in FIG. 12. That is, assuming that the machining position G is given by a measurement data obtained in the measurement processing S 200 after the rough working shown in FIG. 5, a position data Tnca of a NC data command point L of the ball end mill 35 is found in order to perform cutting in the position F, then the correction processing S 400 is executed for the finish working processing S 500.

And the procedure is returned to the measurement processing S 200 to use the touch probe 39 to confirm whether the finish working processing S 500 shown in FIG. 5 has been executed following a scheduled course. In the case where it is judged in the judgment processing S 300 that machining is insufficient, the correction processing S 400 is again executed, in which case flexure of the ball end mill 35 constitutes a main cause for the insufficiency.

When a judgment of acceptance is passed in the judgment processing S 300 in FIG. 5, a state of meshing with a mating reference rotor (a female reference rotor when the male rotor 5 is worked, and a male reference rotor when the female rotor 6 is worked) is confirmed, and then an appropriate surface treatment is applied in a surface treatment S 700, thus terminating the finish working (manufacture) of the male rotor 5.

In the case where a plurality of ball end mills 35 are used individually in the finish working processing S 500, a position data Tnca of a NC data command point L is found for the respective ball end mills in the correction processing S 400. Also, since a position data Tnca of a NC data command point L is varied according to shapes and materials of the respective male and female rotors 5, 6, and a material and a working speed of the ball end mill 35, such various datum are stored in storage means of the personal computer body 52 from the keyboard 54 with the use of the monitoring screen 53 of the personal computer 51 shown in FIG. 4, and used for correction in the formulae (1) to (3).

When deflection of the ball end mill 35 can be beforehand grasped, correction may be calculated in the correction processing S 400 in expectation of such deflection.

Figure 13:
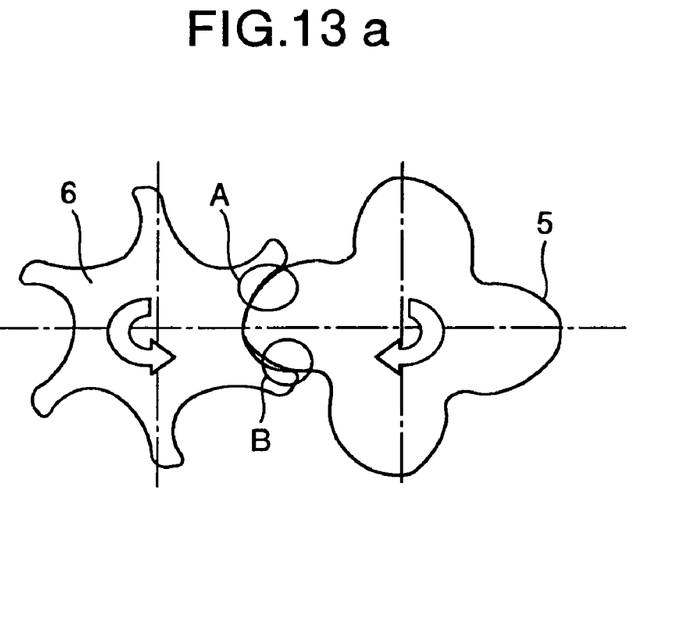
FIGS. 13a and 13b are transverse, cross sectional views illustrating meshing states of respective male and female rotors.

FIGS. 13a and 13b show in cross section a meshing state of the respective male and female rotors 5, 6. FIG. 13a shows a state, in which a tooth of the male rotor 5 meshes with a screw groove of the female rotor 6, and FIG. 13b shows a state, in which a tooth of the female rotor 6 meshes with a screw groove of the male rotor 5. In addition, for easy understanding of a tooth profile, the number of teeth of the male rotor 5 is made in four.

Figure 14:
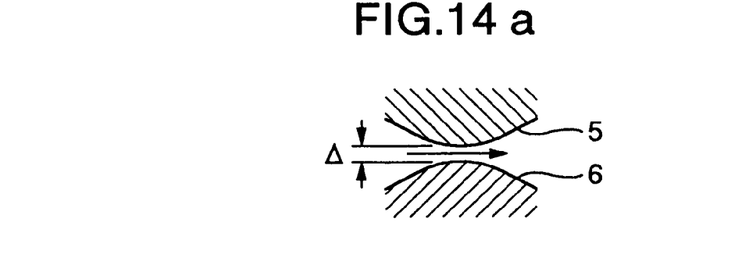
FIGS. 14a and 14b are views illustrating combinations of curved surfaces of respective male and female rotors.

As described above, since the screw grooves are involute in shape, a combination of a convex surface and a convex surface shown in FIG. 14a or a combination of a concave surface and a convex surface shown in FIG. 14b appears according to a meshing position of the male and female rotors 5, 6.

The combination of a concave surface and a convex surface shown in FIG. 14b appears in a location indicated by a circle A in FIG. 13a, and the combination of a convex surface and a convex surface shown in FIG. 14a appears in a location indicated by a circle B in FIG. 13a and locations indicated by a circle C and a circle D in FIG. 13b.

According to an examination made by the inventors of the present application, it has been confirmed that even when a minute gap Δ between the male and female rotors 5, 6 is the same, the combination of a convex surface and a convex surface shown in FIG. 14a brings about a greater leakage of air than that in the combination of a concave surface and a convex surface shown in FIG. 14b. And such tendency is unchanged even when the concave surface and the convex surface are changed in curvature.

The location indicated by the circle B in FIG. 13a and locations indicated by the circle C and the circle D in FIG. 13b, in which much leakage of air is caused, correspond to regions at bottoms of the screw grooves.

In order to decrease leakage of air in these regions, it is preferable to reduce the width of the concave stripes 5a, 6a on both the male and female rotors 5, 6 and a pitch space P between adjacent concave stripes 5a, 6a, thus increasing the fluid resistance.

Here, an explanation will be given to working of the concave stripes 5a, 6a having a small width.

Figure 15:
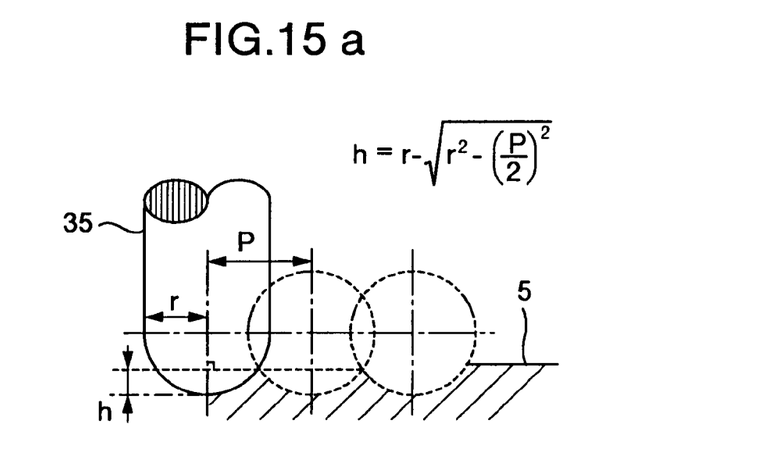
FIGS. 15a and 15b are views illustrating states, in which a ball end mill machines concave stripes on a male rotor.

FIG. 15 shows a situation, in which the ball end mill 35 machines concave stripes 5a on the male rotor 5 by way of example.

In the case where the ball end mill 35 having a tool radius r is used to form respective concave stripes 5a at a pitch space P with a groove wall between adjacent concave stripes 5a having a height h, the tool radius r of the ball end mill 35 and the pitch space P are reduced to provide many concave stripes 5a, whereby the height (groove depth) h of the groove wall between adjacent concave stripes 5a is maintained to cause an increase in fluid resistance, thus enabling decreasing leakage of air.

As an example, in the finish working of a female rotor 6 having a diameter of about 120 mm, only a ball end mill having a diameter of ϕ8 was used to provide 194 concave stripes 6a having a depth (h) of 0.005 mm on respective screw grooves, while in the finish working of a male rotor 5 having a diameter of about 120 mm, while three ball end mills having diameters of ϕ8, ϕ4, ϕ2 were used to provide 287 concave stripes 5a having a depth (h) of 0.005 mm on respective screw grooves, and thus the concave stripes 5a having a small width were specifically provided at a small pitch P on bottoms of the respective screw grooves of the male rotor 5.

In this manner, while concave stripes for decreasing leakage of air may be formed only on one of the rotors in a combination of a convex surface and a convex surface, the concave stripes are preferably formed on the both rotors.

Subsequently, an explanation will be given to a further constitution, in which leakage of air is reduced.

With a screw compressor, axially twisted screw grooves are formed on respective male and female rotors 5, 6, the both rotors 5, 6 are rotated by timing gears fixed to the respective rotors 5, 6 while keeping a desired minute gap therebetween, and a minimum portion of the minute gap separates a suction side and a discharge side from each other. As the both rotors 5, 6 are rotated, the minimum portion of the minute gap moves from the suction side to the discharge side to be decreased in volume on the discharge side, thereby compressing an air. In this case, a path, along which the minimum portion of the minute gap moves, is called a seal line, and the seal line SL moves in a direction, in which an air is compressed.

Figure 16:
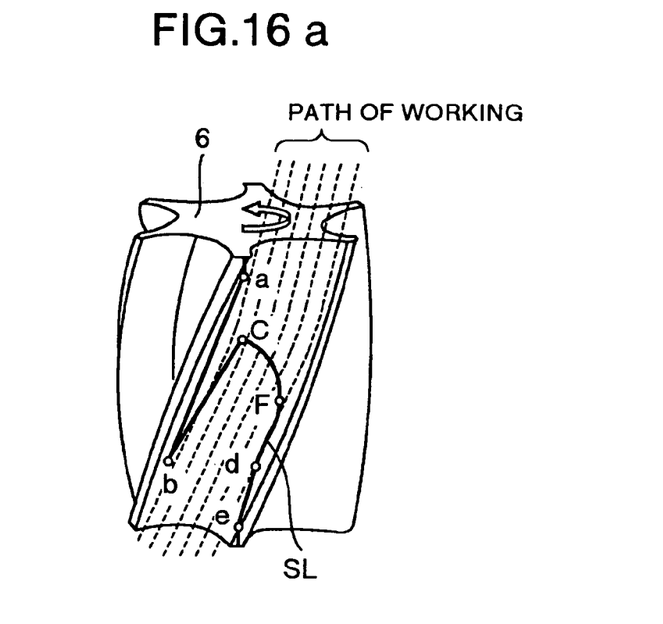
FIGS. 16a and 16b are perspective views illustrating states of seal lines and concave stripes on respective male and female rotors.

FIGS. 16a and 16b show paths of movement of seal lines SL.

A seal line SL on the female rotor 6 shown in FIG. 16a traces a path a–b–C–F–d–e, and a seal line SL on the male rotor 5 shown in FIG. 16b traces a path f–g–H–M–i–j. Paths of working, shown by dotted lines, on the female rotor 6 and the male rotor 5 indicate paths of movement of the ball end mill 35 while the concave stripes 5a, 6a extend along the screw grooves. FIGS. 16a and 16b show the seal lines SL on surfaces of the female rotor 6 and the male rotor 5 in order to illustrate the relationship between the seal lines SL and the concave stripes 5a, 6a. With actual seal lines SL, a position a on the female rotor 6 is the same as a position f on the male rotor 5, and the case is the same with b and g, C and H, F and M, d and i, and e and j.

As seen from FIGS. 16a and 16b, the seal lines SL intersect paths (the concave stripes 5a, 6a) of movement of the ball end mill 35 on the female rotor 6 and the male rotor 5.

Figure 17:
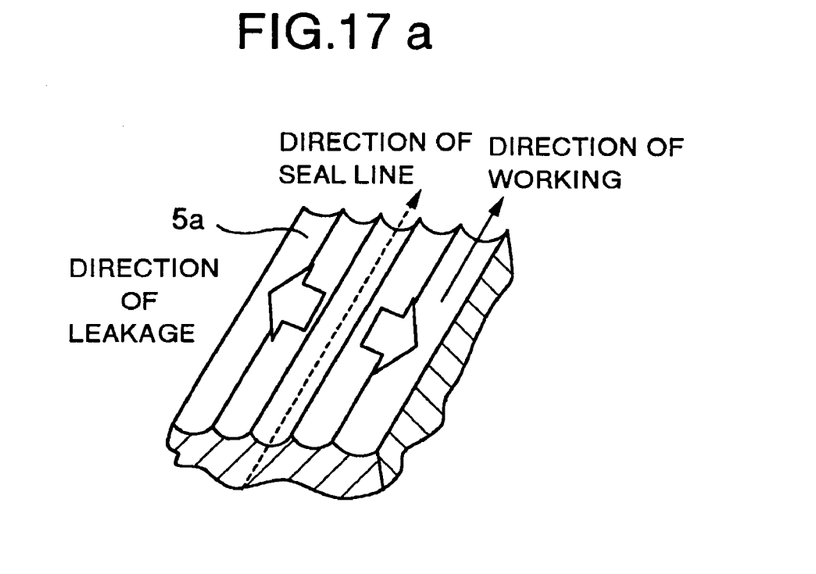
FIGS. 17a and 17b are perspective views illustrating the relationships between seal lines and leakage of air on respective male and female rotors.

FIGS. 17a and 17b show in enlarged scale a direction (movement) of the seal line SL and a direction of working in paths (the concave stripes 5a) of movement of the ball end mill 35 for the male rotor 5.

While the direction (movement) of the seal line SL and the direction of working performed by the ball end mill 35 are in parallel to each other in FIG. 17a, the both intersect each other in FIG. 17b. FIGS. 17a and 17b also show directions of leakage of air. In FIG. 17a, since the concave stripes 5a extend in a direction of air compression indicated by the direction of the seal line SL, the fluid resistance of air in this direction is small but side walls of the concave stripes 5a make an obstacle in a direction perpendicular to the direction to make leakage of air hard. In contrast, it is seen in FIG. 17b that side walls of the concave stripes 5a make an obstacle in the direction of air compression indicated by the direction of the seal line SL to cause an increase in fluid resistance, but the concave stripes 5a extend in a direction intersecting the direction of the seal line SL and allow an air to leak laterally.

Here, it is desirable to prevent an air from leaking laterally in regions, in which the seal line SL intersects the direction of working performed by the ball end mill 35, that is, the concave stripes 5a.

Figure 18:
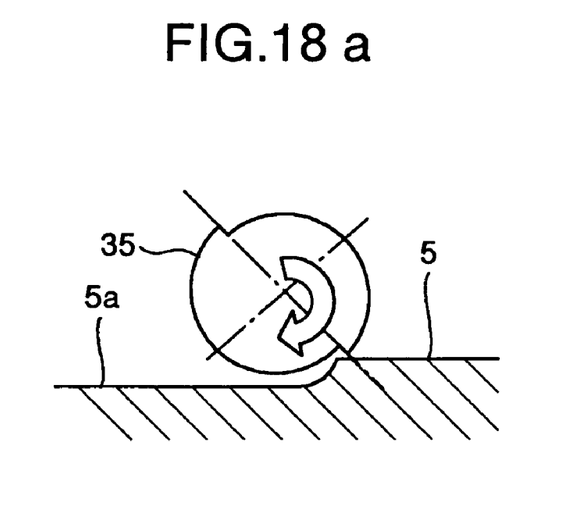
FIGS. 18a and 18b are views illustrating techniques of machining with a ball end mill in a machining-center.

A technique of working with the ball end mill 35 includes down cut and up cut shown in FIGS. 18a and 18b.

In the down cut working, the ball end mill 35 is rotated on, for example, the male rotor 5 as shown in FIG. 18a with a blade edge erected inward from a surface of a workpiece, while in the up cut working, the ball end mill 35 is rotated on, for example, the male rotor 5 as shown in FIG. 18b with a blade edge laid toward a surface of a workpiece from inside.

Figure 19:
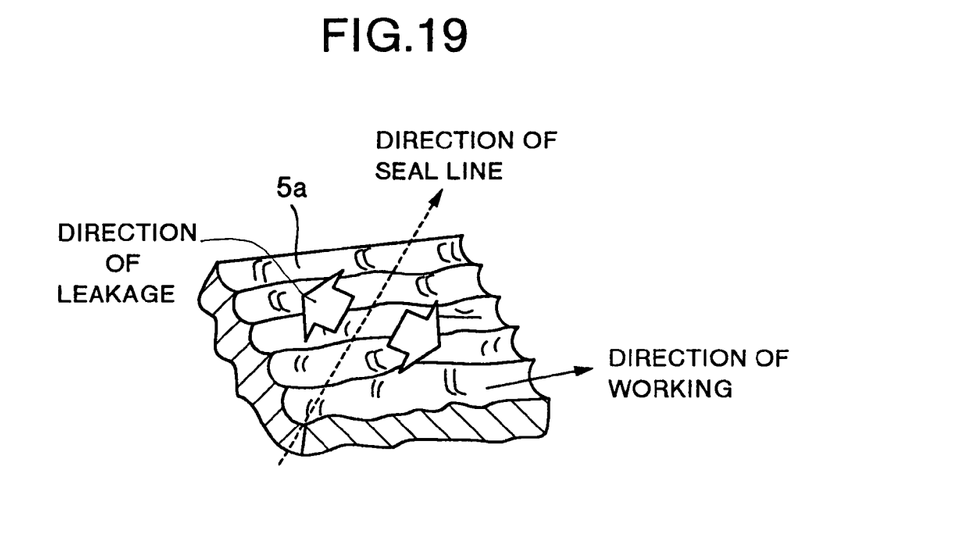
FIG. 19 is a view illustrating a state, in which a ball end mill of a machining-center performs up cut working.

With such down cut working, a shape after the working involves a smooth and clear surface since a workpiece is chipped as if wood is planed along the grain. With such up cut working, a surface is roughened since a workpiece is torn off as if one's mustache is shaven upward. FIG. 19 schematically shows a state, in which concave stripes 5a are formed by means of the up cut working and their surfaces are roughened. Roughness of the surfaces of the concave stripes 5a makes a fluid resistance against an air flow to contribute to suppression of leakage. That is, the concave stripes 5a formed by means of the up cut working to have roughened surfaces function as means for increasing the fluid resistance against an air flow.

Figure 20:
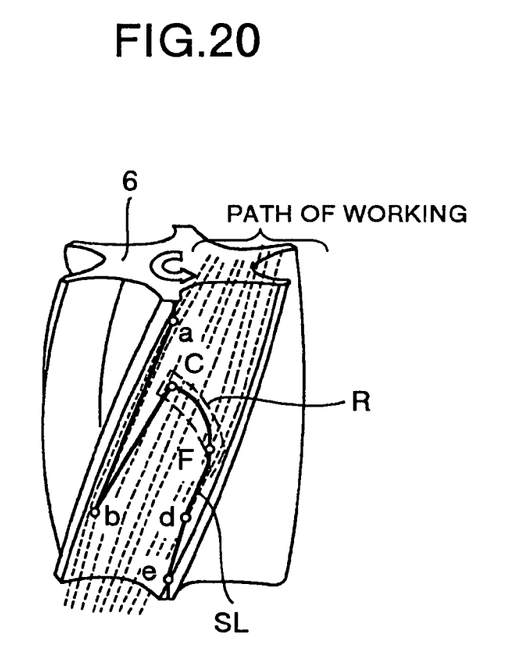
FIG. 20 is a view illustrating those regions on a female rotor, in which a ball end mill performs up cut working and down cut working.

Since paths of movement of the seal lines SL are determined by configurations of respective male and female rotors 5, 6, and accordingly, regions, in which the paths of movement of the seal lines SL intersect the concave stripes 5*a*, 6*a*, are also determined and unchanged even when the respective male and female rotors 5, 6 are rotated, the up cut working is preferably performed in a region R enclosed by dotted lines shown in FIG. 20, in which an embodiment of the female rotor 6 is shown, when the concave stripes 5*a*, 6*a* are provided. Thus, an increase in fluid resistance is avoided by using the down cut working to form concave stripes 6*a* in other regions than the region R enclosed by dotted lines in FIG. 20.

Switchover between the down cut working and the up cut working in the machining-center 31 is simply achieved by reversing a direction of relative movement of the ball end mill 35 and a workpiece with a direction of rotation of the ball end mill 35 left as it is, so that no difficulty is involved in increasing the fluid resistance in the region R, in which the path of movement of the seal line SL intersects the concave stripes 6*a*.

While changing of widths of concave stripes 5*a*, 6*a* and a pitch space P on the basis of a combination of curved surface shapes of screw grooves on respective male and female rotors 5, 6, and application and adjustment of fluid resistance on the basis of intersection of the seal lines SL formed by rotation of the respective male and female rotors 5, 6 and the concave stripes 5*a*, 6*a* may be carried out separately, a combined use of them exhibits a further effect in reducing leakage of air.

As described above, leakage of a compressed air is slight and a high compressive performance is obtained in a screw compressor according to the invention.

Also, a method of manufacturing the screw compressor according to the invention enables manufacturing a screw compressor, in which leakage of a compressed air is slight and a high compressive performance is obtained.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of manufacturing rotors for a screw compressor having a casing, and a male and a female rotor formed with axially twisted screw grooves and accommodated in the casing, the male and female rotors being rotated by timing gears fixed to the male and female rotors while a desired minute gap is kept therebetween, the method comprising performing a finish working, in which concave stripes having a minute depth and extending along directions of twist of and within the screw grooves on the male rotor or the female rotor are formed by machining performed by a machining-center provided with a ball end mill as a tool such that some of the concave stripes are of a different size than others of the concave stripes.

2. The method according to claim 1, wherein the concave stripes in those regions in which curved surfaces of the male and female rotors comprise a combination of a convex surface and a convex surface are formed by means of a ball end mill having a smaller tool radius than that of a ball end mill used in formation of the concave stripes in those regions in which curved surfaces of the male and female rotors comprise a combination of a convex surface and a concave surface.

3. The method according to claim 1, wherein the concave stripes at bottoms of the screw grooves of the male rotor are formed by means of a ball end mill having a smaller tool radius than that of a ball end mill used in formation of the concave stripes in other portions than the bottoms.

4. The method according to claim 1, wherein a ball end mill performs up cut working in those regions in which a movement path of a minimum portion of a minute gap formed between the male and female rotors by rotation of the male and female rotors intersects the concave stripes.

* * * * *